United States Patent
Wade et al.

(10) Patent No.: US 6,853,608 B1
(45) Date of Patent: Feb. 8, 2005

(54) OPTICAL PICKUP APPARATUS AND METHOD OF MANUFACTURING THE SAME

(75) Inventors: Tatsuki Wade, Nagano (JP); Hiroshi Sugihara, Nagano (JP)

(73) Assignee: Sankyo Seiki Mfg. Co., Ltd., Nagano-ken (JP)

( * ) Notice: Subject to any disclaimer, the term of this patent is extended or adjusted under 35 U.S.C. 154(b) by 859 days.

(21) Appl. No.: 09/692,778

(22) Filed: Oct. 19, 2000

(30) Foreign Application Priority Data

Oct. 21, 1999 (JP) .......................................... 11-299009

(51) Int. Cl.$^7$ ................................................ G11B 7/09
(52) U.S. Cl. .................................................. 369/44.15
(58) Field of Search .......................... 369/44.15, 44.16, 369/44.14; 359/812, 813, 823, 824

(56) References Cited

U.S. PATENT DOCUMENTS 4,878,214 A * 10/1989 Hinotani ................... 369/44.15
5,523,891 A * 6/1996 Fujisawa ................... 369/44.15

* cited by examiner

*Primary Examiner*—Thang V. Tran
(74) *Attorney, Agent, or Firm*—Hogan & Hartson, LLP (57) ABSTRACT

An optical pickup apparatus has an objective lens that converges a laser beam on an optical recording medium and a lens holder that retains objective lens. The optical pickup apparatus also has a base member, four linear members having base ends supported by the base member and distal ends coupled to the lens holder. A driving device generates a magnetic force between the lens holder and the base member to elastically deform the linear members to thereby drive the objective lens in a focusing direction and/or a tracking direction. The four linear members have generally an identical configuration, and at least one portion of each of the four linear members in a longitudinal direction thereof has a cross section that is compressed and deformed in the focusing direction and/or tracking direction.

24 Claims, 5 Drawing Sheets

Fig. 6

OPTICAL PICKUP APPARATUS AND METHOD OF MANUFACTURING THE SAME

BACKGROUND OF THE INVENTION

1. Field of the Invention

The present invention relates to an optical pickup apparatus and a method of manufacturing the same. Furthermore, the present invention more particularly relates to a technique for supporting an objective lens in an optical pickup apparatus.

2. Description of Related Art

Figure 1:
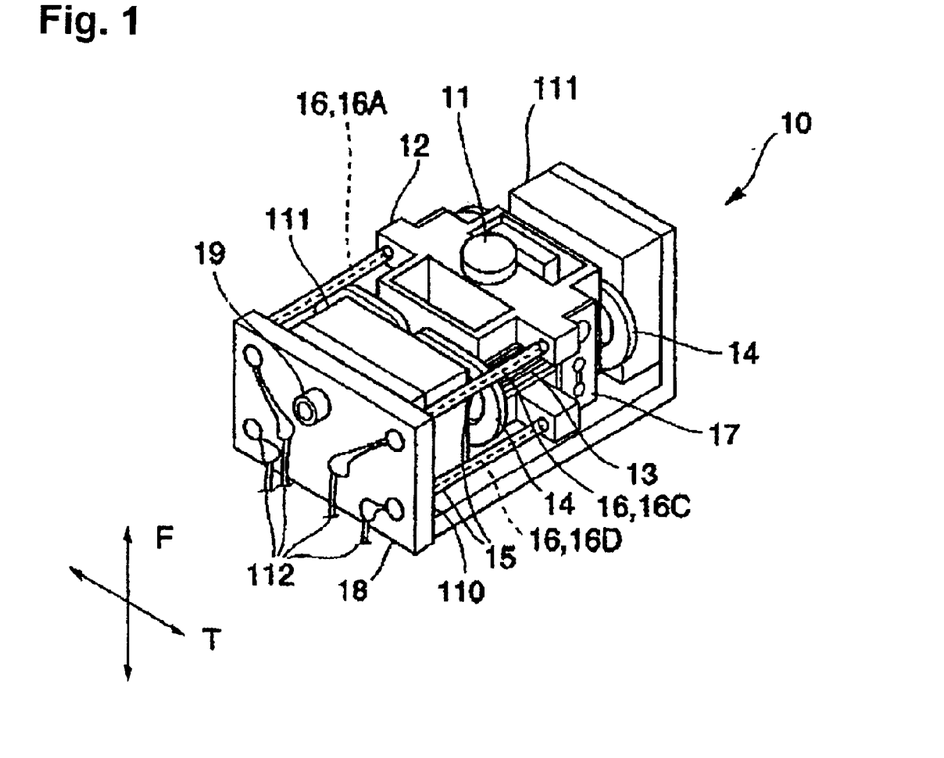
FIG. 1 shows a perspective view of a main portion of an optical pickup apparatus.
Figure 2:
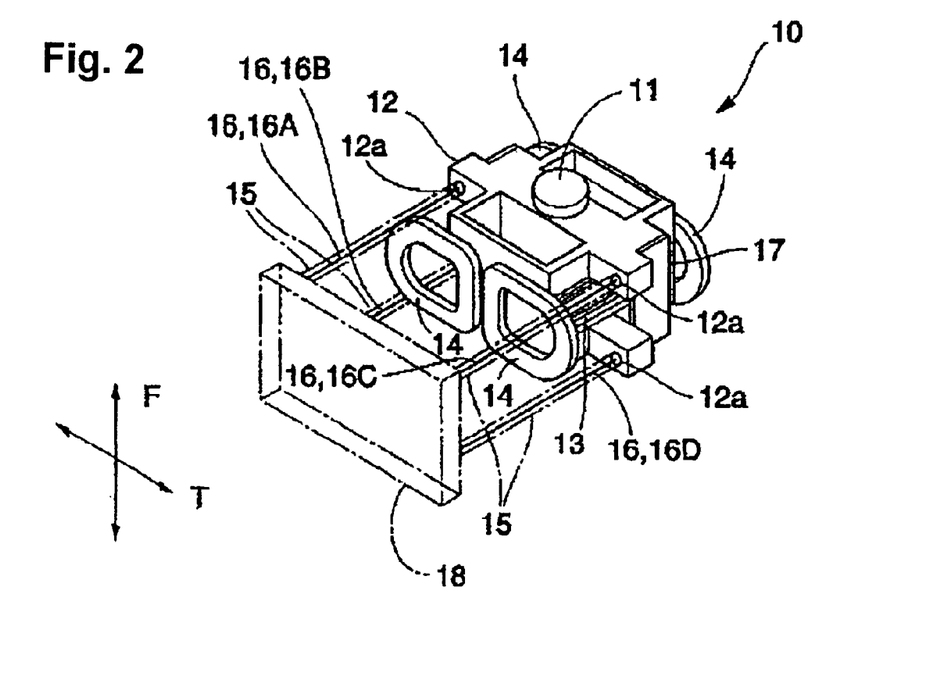
FIG. 2 shows a perspective view of a support structure of a lens holder in the optical pickup apparatus.

Japanese patent HEI 4-49174 describes an optical pickup apparatus that is used to reproduce or record data on an optical recording media. For example, as shown in FIGS. 1 and 2, an optical pickup apparatus typically has an objective lens 11 that is retained by a lens holder 12. A driving coil 13 for focusing operation is wound around the lens holder 12. Two pairs of driving coils for tracking operation 14 are fixedly adhered to two sides of the lens holder 12.

It is noted that the lens holder 12 is supported by a cantilever that is formed by four metal linear members 16. More particularly, the linear members 16 resiliently support the lens holder 12, and also function to supply an electric power from a fixing member 110 affixed to a base substrate to the driving coils 13 and 14 that are mounted on the lens holder 12. The linear members 16 are covered by insulation tubes such as rubber tubes 15. Base end sections 161 of the linear members 16 are affixed to the fixing member 110, and distal end sections 162 of the linear members 16 are affixed to the lens holder 12. When an electricity is supplied to the driving coils 13 and 14 through the linear members 16, a magnetic force is generated between the driving coils 13 and 14 and magnets 111. As a result, the lens holder 12 is moved by the magnetic force in a focusing direction (n a direction indicated by an arrow F) and/or a tracking direction (in a direction indicated by an arrow T) against the resilience of the linear members 16. The objective lens 11 is also moved in association with the movements of the lens holder 12 in the focusing direction and/or the tracking direction.

Figure 4:
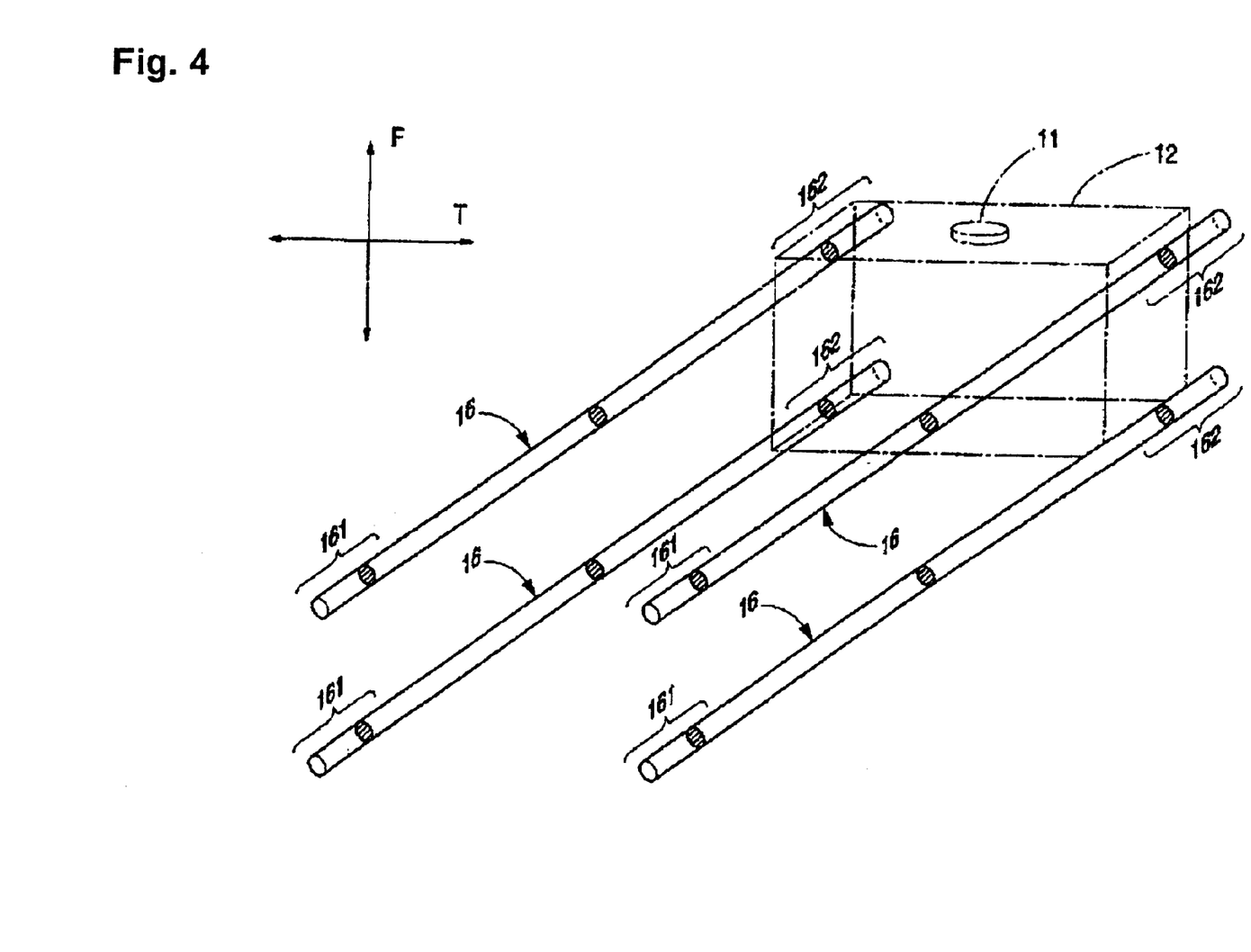
FIG. 4 shows linear members in an optical pickup apparatus that support a lens holder in a cantilever fashion, in which each of the linear members has a uniform circular cross section.

In the optical pickup apparatus 10 composed in the manner described above, each of the linear members 16 conventionally has a uniform cross section along the entire length thereof, as shown in FIG. 4.

However, there are problems in the conventional structure to support the lens holder 12. When the optical pickup apparatus 10 are reduced in size and thickness, the lens holder 12 becomes more difficult to properly move in the focusing direction and the tracking direction.

More particularly, when the optical pickup apparatus 10 is reduced in size and thickness, and the lens holder 12 is also reduced in size and thickness, separations between the linear members 16 in the focusing direction and the tracking direction also need to be shortened. When the separations between the linear members 16 in the focusing direction and the tracking direction are shortened, it becomes more difficult to properly control the position of the lens holder 12 when the lens holder 12 is moved in the focusing direction or the tracking direction.

For example, when the lens holder 12 is reduced in thickness, in other words, the thickness of the lens holder 12 is reduced in a direction F of FIG. 1, the distance between the linear members 16 in the focusing direction is shortened. As a result, the linear members 16 would behave move like a single linear member that supports the lens holder 12 in the focusing direction, and therefore the linear members 16 would more likely twist in the focusing direction. Accordingly, when the lens holder 12 is moved in the tracking direction, the lens holder 12 would more likely tilt.

Also, when the lens holder 12 is reduced in width, in other words, when the distance between the linear members 16 in the tracking direction is shortened, an opposite condition occurs. Namely, the linear members 16 would more likely twist in the tracking direction. Accordingly, when the lens holder 12 is moved in the focusing direction, the lens holder 12 would more likely tilt.

SUMMARY OF THE INVENTION

In view of the problems described above, it is an object of the present invention to provide an optical pickup apparatus with a structure in which a lens holder is supported by four linear members and a method of manufacturing the same that can properly move the lens holder in a focusing direction and a tracking direction, even when the optical pickup apparatus is reduced in size and thickness.

In accordance with one embodiment of the present invention, an optical pickup apparatus has an objective lens that converges a laser beam on an optical recording medium, a lens holder that retains objective lens, a fixing member affixed to the optical pickup apparatus, four linear members having base ends supported by the fixing member and distal ends coupled to the lens holder, and a driving device that generates a magnetic force between the lens holder and the fixing member to elastically deform the linear members to thereby drive the objective lens in a focusing direction and a tracking direction. The four linear members have generally an identical configuration in which at least one portion of each of the four linear members in a longitudinal direction thereof has a cross section that is compressed and deformed in the focusing direction and/or tracking direction.

In the embodiment of the present invention, each of the four linear members that support the lens holder in a cantilever fashion has at least one portion whose cross section is compressed to deform in the focusing direction or the tracking direction. For example, when the linear member has a cross-sectional shape that is compressed and deformed in the tracking direction, the linear member would likely bend in th tracking direction, but would be difficult to bend in the focusing direction. Inversely, when the linear member has a cross-sectional shape that is compressed and deformed in the focusing direction, the linear member would likely bend in the focusing direction, but would be difficult to bend in the tracking direction. In this manner, depending on designed specification and characteristic of an optical pickup apparatus, the linear member is provided with at least one portion that is squeezed and deformed in either of the focusing direction or the tracking direction to thereby make an adjustment to provide the linear member with a bending direction in which the linear member would readily bends. As a result, when the lens holder is moved in the focusing direction or the tracking direction, the occurrence of undesirable conditions, such as tilting of the lens holder (and the objective lens) and the like can be prevented.

Also, since only a portion of each of the linear members along its longitudinal direction is squeezed and deformed, the linear member can secure the bendability in the direction in which the linear members are compressed. The bendability of the linear member can be optionally adjusted by changing the range and location where the linear member is compressed and deformed with respect to the longitudinal direction of the linear member and the degree of compression and deformation. Accordingly, when the optical pickup apparatus is reduced in size and thickness, and the flexibility of the linear member requires an adjustment for properly driving the lens holder (and the objective lens), such an adjustment can be readily and properly made. This provides a higher degree of freedom in designing the optical pickup apparatus.

In accordance with the present invention, each of the four linear members has a portion that has a cross-sectional configuration that is squeezed and deformed, for example, in the tracking direction. This structure makes the linear members difficult to bend in the focusing direction. Therefore, even when the lens holder is made thinner and the distance between the linear members in the focusing direction becomes shorter, the linear members are difficult to twist in the focusing direction, and the lens holder does not tilt when the lens holder is moved in the tracking direction. Also, because only a portion of the linear member in its longitudinal direction is squeezed and deformed in the tracking direction, the linear member also has an appropriate bendability in the focusing direction. As a result, no problems occur in driving the lens holder (or the objective lens) in the focusing direction.

In accordance with another embodiment of the present invention, each of the four linear members may have a portion that has a cross-sectional configuration that is squeezed and deformed in the focusing direction. This structure makes the linear members difficult to bend in the tracking direction. Therefore, even when the lens holder is made narrower and the distance between the linear members in the tracking direction becomes shorter, the linear members are difficult to twist in the tracking direction, and the lens holder does not tilt when the lens holder is moved in the focusing direction. Also, because only a portion of the linear member along its longitudinal direction is squeezed and deformed in the focusing direction, the linear member also has an appropriate bendability in the tracking direction. As a result, the lens holder (or the objective lens) can be driven in the tracking direction free of problems.

In accordance with one embodiment of the present invention, each of the four linear members may have one portion in its longitudinal direction that is squeezed and deformed in the tracking direction and another portion that is squeezed and deformed in the focusing direction. With this structure, when the lens holder is moved in the focusing direction, the linear members mainly bend about the portions that are squeezed and deformed in the focusing direction, but difficult to bend in the tracking direction at the portions that are squeezed and deformed in the focusing direction and therefore the lens holder (and the objective lens) is substantially prevented from tilting. When the lens holder is moved in the tracking direction, the linear members mainly bend about the portions that are squeezed and deformed in the tracking direction, but difficult to bend in the focusing direction at the portions that are squeezed and deformed in the tracking direction and therefore the lens holder (and the objective lens) is substantially prevented from tilting. In accordance with the embodiment of the present invention, only a portion of the linear member in its longitudinal direction is squeezed and deformed. Therefore, the bendability of each portion of the linear member can be adjusted by changing the range and the degree in which the linear member is squeezed and deformed. Accordingly, the characteristic of the linear member can be adjusted and corrected depending on the specification and the designed characteristic of the optical pickup apparatus. Therefore, the degree of freedom in designing the optical pickup apparatus is further improved.

In accordance with one embodiment of the present invention, the optical pickup apparatus described above may preferably be manufactured by a method including the steps of supporting the lens holder on the fixing member by the four linear members, and then squeezing and deforming one portion of each of the four linear members along its longitudinal direction in at least one of the focusing direction and the tracking direction. By this method, the characteristic of the linear member can be adjusted based on required characteristics of the lens holder (and the objective lens).

In accordance with one embodiment of the present invention, the four linear members may preferably be disposed in a manner that each two of the linear members overlap each other as viewed in the focusing direction and the tracking direction. Furthermore, the two of the linear members that overlap each other as viewed in the focusing direction are simultaneously squeezed and deformed to form portions of the linear members that are squeezed and deformed in the tracking direction.

In accordance with another embodiment of the present invention, the four linear members may preferably be disposed in a manner that each two of the linear members overlap each other as viewed in the focusing direction and the tracking direction, and the two of the linear members that overlap each other as viewed in the tracking direction are simultaneously squeezed and deformed to form portions of the linear members that are squeezed and deformed in the focusing direction.

As a result, the adjustment work for adjusting the characteristic of the linear members can be effectively performed based on the designed characteristic of the lens holder (and the objective lens). Also, the two linear members can be simultaneously compressed and deformed with the same quality and accuracy.

Other features and advantages of the invention will be apparent from the following detailed description, taken in conjunction with the accompanying drawings that illustrate, by way of example, various features of embodiments of the invention.

PREFERRED EMBODIMENTS

Embodiments of the present invention are described below with reference to the accompanying drawings.

Figure 3:
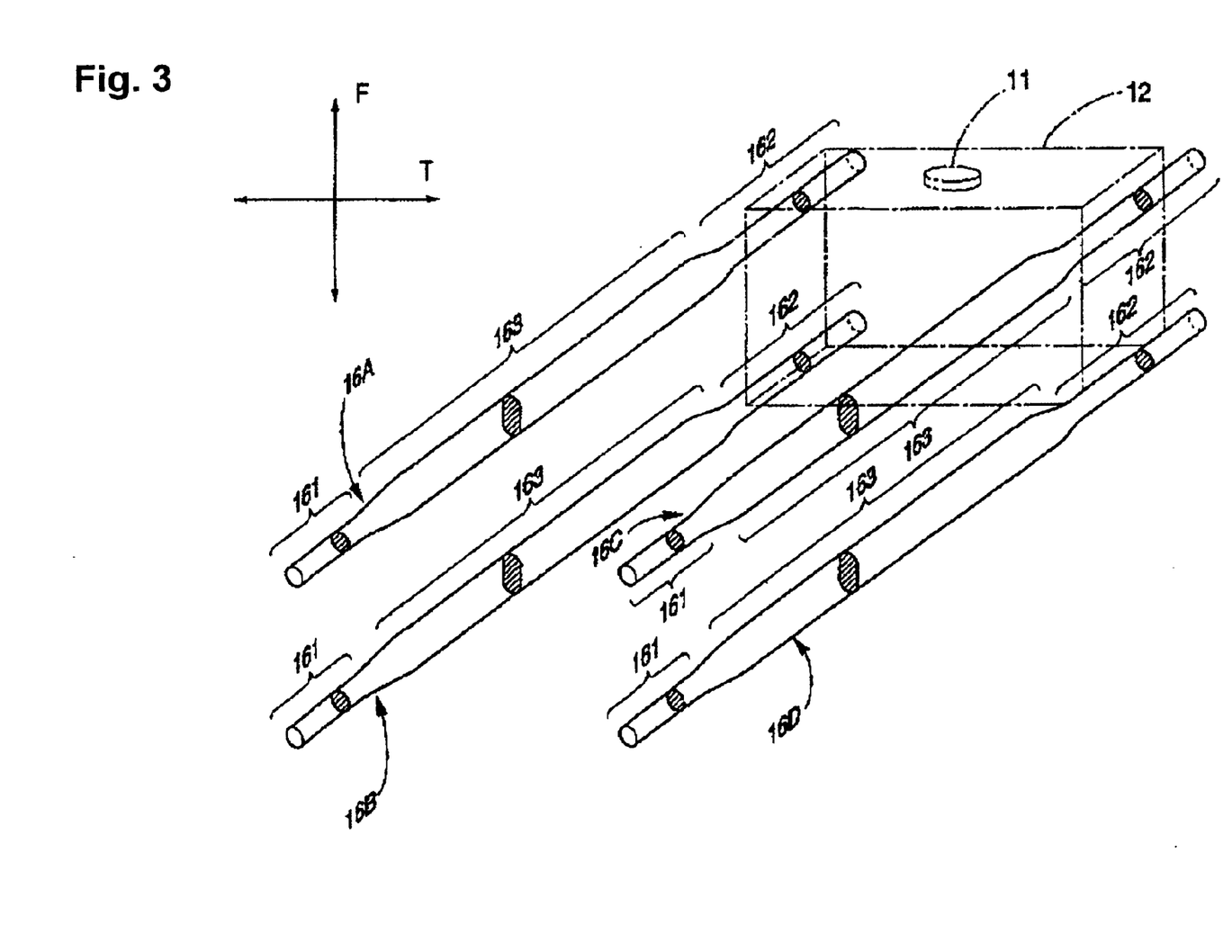
FIG. 3 shows an expanded perspective view of four linear members that support a lens holder in a cantilever fashion in an optical pickup apparatus in accordance with a first embodiment of the present invention.

FIGS. 1 and 2 show perspective views of a main portion of an optical pickup apparatus 10 and a support structure of a lens holder 12 in the optical pickup apparatus 10, respectively. FIG. 3 shows an expanded perspective view of four linear members 16 that support the lens holder 12 in a cantilever fashion in the optical pickup apparatus 10, in accordance with a first embodiment of the present invention. FIG. 4 shows conventional four linear members in an optical pickup apparatus that support a lens holder in a cantilever fashion, in which each of the linear members has a uniform circular cross section.

As shown in FIGS. 1 and 2, the optical pickup apparatus 10 includes an objective lens 11 that focuses a laser beam emitted from a light source (not shown) on an optical recording medium (not shown) and the lens holder 12 that retains the objective lens 11. A driving coil for focusing correction 13 is wound around the lens holder 12, and two pairs of driving coils for tracking correction 14 are fixedly adhered to opposing side surfaces of the lens holder 12.

In the optical pickup apparatus 10 of the present embodiment, the lens holder 12 is resiliently supported by four metal linear members 16A, 16B, 16C and 16D in a cantilever fashion. The four linear members 16A, 16B, 16C and 16D also function to supply an electric power to the lens holder 12 from a fixing member 110. An insulation member such as a rubber tube 15 covers each of the four linear members 16A, 16B, 16C and 16D. Base end sections 161 of the respective four linear members are affixed to the fixing member 110. Distal end sections 162 thereof pass through apertures 12a defined in the opposing upper and lower side faces of the lens holder 12 and are soldered to a printed substrates 17 that is attached to a side surface of the lens holder 12.

Both ends of the driving coil for focusing correction 13 and both ends of the driving coils for tracking correction 14 are soldered to the printed substrate 17. The driving coils 13 and 14 are electrically coupled to the respective linear members 16A, 16B, 16C and 16D through conductive members such as copper foil patterns on the printed substrate 17.

On the other hand, the base end sections 161 of the linear members 16A, 16B, 16C and 16D are soldered to a printed substrate 18 (that is provided on the side of the fixing member 110). The printed substrate 18 is affixed to a side surface of the fixing member 110 that is in a channel shape by a screw 19. The fixing member 110 is formed from a magnetic material, and two magnets 111 are fixedly adhered to opposing internal surfaces of the fixing member 110, to thereby form, together with the driving coils 13 and 14, a magnetic path. Lead wires 112 are soldered to the printed substrate 18. The lead wires 112 are electrically connected to the linear members 16A, 16B, 16C and 16D through conductive members such as copper foil patterns on the printed substrate 18.

The four linear members 16A, 16B, 16C and 16D are disposed in parallel with each other in a manner that each two of the linear members overlap each other at the same location as viewed in a focusing direction (in a direction indicated by an arrow F) and in a tracking direction (in a direction indicated by an arrow T). In other words, when viewed from one side ends of the four linear members 16A, 16B, 16C and 16D, the linear members 16A, 16B, 16C and 16D are disposed at four corners of a rectangle with shorter edges extending in the focusing direction and longer edges extending in the tracking direction.

When an electric power is applied to the lead wires 112 in the optical pickup apparatus 10 thus composed, the electric power is supplied to the driving coil for focusing correction 13 and the driving coils for tracking correction 14 through the linear members 16, such that magnetic forces are generated between the driving coils 13 and 14 and the magnets 111. The linear members 16A, 16B, 16C and 16D are bent by the magnetic forces, and thus the lens holder 12 moves in the focusing direction and/or the tracking direction against the resilience of the linear members 16A, 16B, 16C and 16D. As a result, the objective lens 11 also moves in the focusing direction and/or the tracking direction. A laser beam emitted from a light source (not shown) transmits the objective lens 11 and is irradiated at a specified position on the optical recording medium. By detecting a reflected beam, data on the optical recording medium can be reproduced, or data can be recorded on the optical recording medium.

In the optical pickup apparatus 10 thus composed, in accordance with one embodiment of the present invention, as shown in FIG. 3, each of the end sections (the base end sections 161 and the distal end sections 162) of the four linear members 16A, 16B, 16C and 16D has a circular cross section. However, a central section 163 of each of the linear members 16A, 16B, 16C and 16D along a longitudinal direction thereof is squeezed and deformed in the tracking direction. In other words, the central section 163 of each of the linear members 16A, 16B, 16C and 16D is flattened by a compressive force applied in the tracking direction.

In accordance with one embodiment of the present invention, the squeezed and deformed section 163 generally has a rectangular cross section, an elliptic cross section or the like. In other words, the squeezed and deformed section 163 of each of the linear members 16A, 16B, 16C and 16D has a cross section that has a diameter longer in the focusing direction and shorter in the tracking direction than the diameter of each of the end sections 161 and 162. In one embodiment, the central sections 163 in the respective four linear members 16A, 16B, 16C and 16D are squeezed and deformed in the tracking direction generally at the same position and in the same range with respect to their longitudinal direction, and in the same degree of deformation. Each of the linear members 16A, 16B, 16C and 16D having the configuration described above can be formed from a linear member 16 having a uniform cross section shown in FIG. 4. A central portion 163 of the linear member 16 is compressed and deformed in the tracking direction, in other words, flattened by a compressive force applied in the tracking direction.

As described above, in the optical pickup apparatus 10 of the present embodiment, each of the linear members 16A, 16B, 16C and 16D has one portion (the central portion) that is squeezed and deformed in the tracking direction and has a generally rectangular cross section 163. As a result, the linear members 16A, 16B, 16C and 16D would likely bend in the tracking direction, but would be difficult to bend in the focusing direction.

In accordance with the present embodiment, one portion of each of the linear members 16A, 16B, 16C and 16D can be flattened by a compressive force applied in the tracking direction in a variety of different magnitudes depending on the designed specification and characteristic of the optical pickup apparatus 10. As a result, the linear members 16A, 16B, 16C and 16D are readily adjusted to bend in a specified direction and with a specified amount.

Therefore, even when the lens holder 12 is made thinner, and the distance between the linear members 16A and 16B and between the linear members 16C and 16D in the focusing direction becomes shorter, an adjustment can be readily made such that the linear members 16A, 16B, 16C and 16D are difficult to twist in the focusing direction, and the lens holder 12 and the objective lens 11 are prevented from tilting when the lens holder 12 is moved in the tracking direction.

Also, only a portion of each of the linear members 16A, 16B, 16C and 16D along its longitudinal direction is squeezed and deformed, and the remaining portions, in other words, both end sections of each of the linear members 16A, 16B, 16C and 16D have an ordinary circular cross section. Accordingly, the linear members 16A, 16B, 16C and 16D also have an appropriate bendability in the focusing direction. As a consequence, the tens holder 12 (and the objective lens 11) can be driven in the focusing direction substantially free of problems.

Furthermore, in the optical pickup apparatus 10 of the present embodiment, only a portion of each of the linear members 16A, 16B, 16C and 16D in its longitudinal direction is squeezed and deformed. The bendability of the linear members 16A, 16B, 16C and 16D can be adjusted by changing the range and location at which the linear members 16A, 16B, 16C and 16D are squeezed and deformed with respect to their longitudinal direction and the degree of compression and deformation (length and width ratio). Accordingly, when the optical pickup apparatus 10 is reduced in size and thickness, and the flexibility of the linear members 16A, 16B, 16C and 16D requires a fine adjustment for properly driving the lens holder 12 (and the objective lens 11), such an adjustment can be readily and properly made. Therefore, a higher degree of freedom in designing the optical pickup apparatus 10 is attained.

When the optical pickup apparatus 10 having the structure described above is manufactured, in accordance with one embodiment of the present invention, the lens holder 12 is supported on the fixing member 110 in a cantilever fashion, using the four linear members 16 each having a uniform cross section as shown in FIG. 4, and then one portions of the linear members 16A, 16B, 16C and 16D in their longitudinal direction are compressed and deformed by a press in the tracking direction based on required characteristics of the lens holder 12 (and the objective lens 11).

In accordance with one embodiment of the present invention, the four linear members 16A, 16B, 16C and 16D are disposed in a manner that each two of the linear members overlap each other as viewed in the focusing direction and the tracking direction. When the linear members 16A, 16B, 16C and 16D are flattened in the tracking direction, the two linear members 16A and 16B that overlap each other as viewed in the focusing direction are simultaneously compressed and deformed, and then the other two linear members 16C and 16D are simultaneously compressed and deformed. Alternatively, the two linear members 16C and 16D that overlap each other as viewed in the focusing direction may first be subject to the simultaneous flattening work, and then the remaining two linear members 16A and 16B may be subject to the simultaneous flattening work.

As a result, the work for adjusting and correcting the characteristics of the linear members 16A, 16B, 16C and 16D can be effectively performed based on the desired characteristics of the lens holder 12 (and the objective lens 11). Also, each two of the linear members (the linear members 16A and 16B or the linear members 16C and 16D) can be simultaneously compressed by a press with the same quality and accuracy. As a result, variations in the bending degree among the linear members 16A, 16B, 16C and 16D do not occur.

Figure 5:
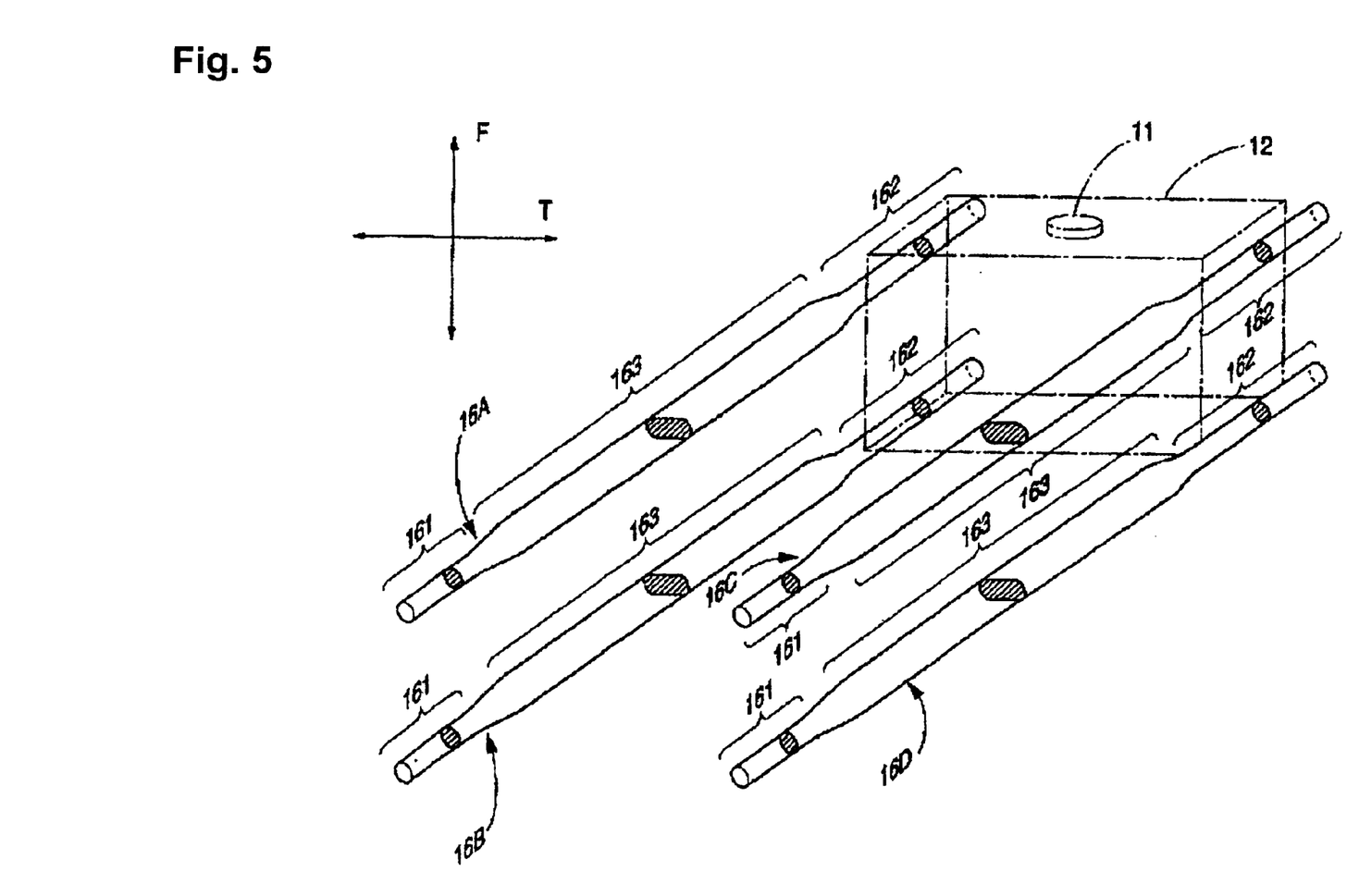
FIG. 5 shows an expanded perspective view of four linear members that support a lens holder in a cantilever fashion in an optical pickup apparatus in accordance with a second embodiment of the present invention.

FIG. 5 shows an expanded view of four linear members in an optical pickup apparatus in accordance with a second embodiment of the present invention. The linear members support a lens holder in a cantilever fashion. The linear members of the optical pickup apparatus in the present embodiment are different from those of the optical pickup apparatus of the first embodiment. However, the overall structure of the optical pickup apparatus is the same as that of the optical pickup apparatus of the first embodiment. Accordingly, the description of the overall structure of the optical pickup apparatus of the second embodiment is omitted.

In the optical pickup apparatus of the present embodiment, four linear members 16A, 16B, 16C and 16D also resiliently support the lens holder 12 in a cantilever fashion. The four linear members 16A, 16B, 16C and 16D are also disposed in a manner that each two of the linear members overlap each other as viewed in a focusing direction (a direction indicated by an arrow F) and in a tracking direction (a direction indicated by an arrow T), in a manner similar to the first embodiment.

In accordance with the present embodiment, as shown in FIG. 5, each of the four linear members 16A, 16B, 16C and 16D has end sections (a base end section 161 and a distal end section 162) each having a circular cross section. However, each of the four linear members 16A, 16B, 16C and 16D has a central section 163 extending along in their longitudinal direction, which is compressed and deformed in the focusing direction, in other words, flattened by a compressive force applied in the focusing direction. In one embodiment, the compressed and deformed central section 163 has a generally rectangular cross section, an elliptic cross section or the like. In other words, each of the central sections 163 of the linear members 16A, 16B, 16C and 16D has a diameter longer in the tracking direction and shorter in the focusing direction than the diameter of each of the end sections 161 and 162.

It is noted that the central sections 163 in the respective four linear members 16A, 16B, 16C and 16D are compressed and deformed in the focusing direction at the same position and in the same range with respect to their longitudinal direction, and in the same magnitude of compression and deformation (i.e., the same length and width ratio). In one embodiment, a linear member 16 having a uniform cross section shown in FIG. 4 is compressed and deformed in the focusing direction along its central section to form each of the linear members 16A, 16B, 16C and 16D having the configuration described above.

As described above, in the optical pickup apparatus 10 structured in a manner described above, each of the linear members 16A, 16B, 16C and 16D has one portion (the central portion 163) that is compressed and deformed in the focusing direction. As a result, the linear members 16A, 16B, 16C and 16D would likely bend in the focusing direction, but would be difficult to bend in the tracking direction. In other words, in accordance with the present embodiment, one portion of each of the linear members 16A, 16B, 16C and 16D can be compressed and deformed in the focusing direction depending on the specification and desired characteristic of the optical pickup apparatus 10 to make a correction, such that the linear members 16A, 16B, 16C and 16D would readily bend in a specified direction. Therefore, even when the lens holder 12 is made narrower, and the distance between the linear members 16A and 16C and between the linear members 16B and 16D in the tracking direction becomes shorter, an adjustment can be readily made such that the linear members 16A, 16B, 16C and 16D are difficult to twist in the tracking direction. As a result, the lens holder 12 (and the objective lens 11) is prevented from tilting when the lens holder 12 is moved in the focusing direction.

Also, since only a portion of each of the linear members 16A, 16B, 16C and 16D in its longitudinal direction is compressed and deformed in the focusing direction, the linear members 16A, 16B, 16C and 16D also maintains an appropriate bendability in the tracking direction. As a consequence, no problems arise in driving the lens holder 12 (and the objective lens 11) in the tracking direction.

Furthermore, since only a portion of each of the linear members 16A, 16B, 16C and 16D in its longitudinal direction is compressed and deformed, the bendability of the linear members 16A, 16B, 16C and 16D can be adjusted by changing the range and location at which the linear members 16A, 16B, 16C and 16D are compressed and deformed with respect to the longitudinal direction thereof and the degree of compression and deformation. Accordingly, when the optical pickup apparatus 10 is reduced in size and thickness, and the flexibility of the linear members 16A, 16B, 16C and 16D requires a fine adjustment for properly driving the lens holder 12 (and the objective lens 11), such an adjustment can be readily and properly made. Therefore, a higher degree of freedom in designing the optical pickup apparatus 10 is attained.

When the optical pickup apparatus 10 having the structure described above is manufactured, the lens holder 12 is supported on the fixing member 110 in a cantilever fashion by the four linear members 16 each having a uniform cross section as shown in FIG. 4, and then one portions of the linear members 16A, 16B, 16C and 16D in their longitudinal direction are compressed and deformed in the focusing direction by a press based on required characteristics of the lens holder 12 (and the objective lens 11).

The four linear members 16A, 16B, 16C and 16D are disposed in a manner that each two of the linear members overlap each other as viewed in the focusing direction and the tracking direction. When the linear members 16A, 16B, 16C and 16D are flattened by a compressive force applied in the focusing direction, the two linear members 16A and 16C that overlap each other as viewed in the tracking direction are simultaneously compressed and deformed, and then the other two linear members 16B and 16D are simultaneously compressed and deformed.

Alternatively, the two linear members 16B and 16D that overlap each other as viewed in the tracking direction may first be subject to the simultaneous flattening work, and then the remaining two linear members 16A and 16C may be subject to the simultaneous flattening work.

As a result, the work for adjusting and correcting the characteristics of the linear members 16A, 16B, 16C and 16D can be effectively performed based on the desired characteristics of the lens holder 12 (and the objective lens 11). Also, each two of the linear members (the linear members 16A and 16C or the linear members 16B and 16D) can be simultaneously compressed by a press with the same quality and accuracy. As a result, variations in the bending degree among the linear members 16A, 16B, 16C and 16D do not occur.

Figure 6:
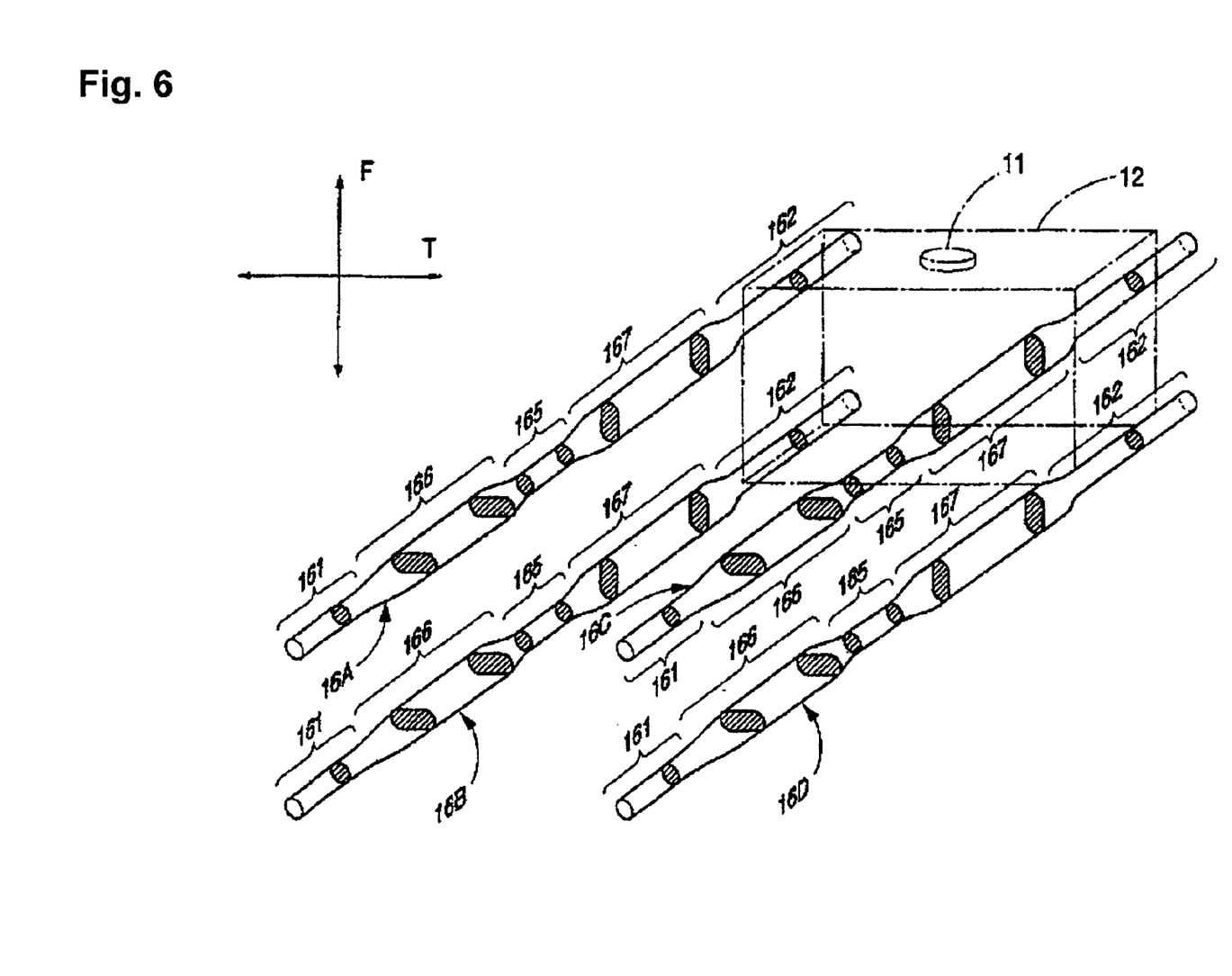
FIG. 6 shows an expanded perspective view of four linear members that support a lens holder in a cantilever fashion in an optical pickup apparatus in accordance with a third embodiment of the present invention.

FIG. 6 shows an expanded view of four linear members in an optical pickup apparatus in accordance with a third embodiment of the present invention. The linear members support a lens holder in a cantilever fashion. The linear members of the optical pickup apparatus in the present embodiment are different from those of the optical pickup apparatuses of the first and second embodiments. However, the overall structure of the optical pickup apparatus of the third embodiment is substantially the same as those of the optical pickup apparatuses of the first and second embodiments. Accordingly, the description of the overall structure of the optical pickup apparatus of the third embodiment is omitted.

In the optical pickup apparatus of the present embodiment, four linear members 16A, 16B, 16C and 16D also resiliently support the lens holder 12 in a cantilever fashion. The four linear members 16A, 16B, 16C and 16D are also disposed in a manner that each two of the linear members overlap each other as viewed in a focusing direction (a direction indicated by an arrow F) and in a tracking direction (a direction indicated by an arrow T), in a manner similar to the first and second embodiments.

In accordance with the present embodiment, as shown in FIG. 6, each of the four linear members 16A, 16B, 16C and 16D has end sections (a base end section 161 and a distal end section 162) and a central section 165 in its longitudinal direction each having a circular cross section. However, a portion 166 closer to the base end section with respect to the central section 165 is compressed and deformed in the focusing direction, or flattened by a compressive force applied in the focusing direction. For example, the portion 166 has a generally rectangular cross section, an elliptic cross section or the like, which is deformed in the focusing direction by a compressive force. Also, a portion 167 closer to the distal end section with respect to the central section 165 is compressed and deformed in the tracking direction, or flattened by a compressive force applied in the tracking direction. For example, the portion 167 has a generally rectangular cross section, an elliptic cross section or the like which is deformed in the tracing direction by a compressive force.

In other words, the portion 166 closer to the base end section of each of the linear members 16A, 16B, 16C and 16D is formed to have the cross section that has a diameter longer in the tracking direction and shorter in the focusing direction. On the other hand, the portion 167 closer to the distal end section of each of the linear members 16A, 16B, 16C and 16D is formed to have the cross section that has a diameter longer in the focusing direction and shorter in the tracking direction.

It is noted that the portions 166 closer to the base end sections in the respective four linear members 16A, 16B, 16C and 16D are compressed and deformed in the focusing direction at the same position and in the same range with respect to their longitudinal direction, and in the same magnitude of compression and deformation. Also, the portions 167 closer to the distal end sections in the respective four linear members 16A, 16B, 16C and 16D are compressed and deformed in the tracking direction at the same position and in the same range with respect to their longitudinal direction, and in the same magnitude of compression and deformation.

Each of the linear members 16A, 16B, 16C and 16D having the configuration described above can also be formed with a linear member 16 having a uniform cross section shown in FIG. 4. A portion of the linear member 16 corresponding to the portion 166 closer to the base end section is compressed and deformed in the focusing direction by a press, and a portion of the linear member 16 corresponding to the portion 167 closer to the distal end section is compressed and deformed in the tracking direction by a press.

As described above, in accordance with the present embodiment, based on the specification and characteristic of the optical pickup apparatus 10, the portion 166 closer to the base end section of each of the linear members 16A, 16B, 16C and 16D is compressed and deformed in the focusing direction by a press, and the portion 167 closer to the distal end section of each of the linear members 16A, 16B, 16C and 16D is compressed and deformed in the tracking direction by a press. In this manner, a correction is made such that the linear members 16A, 16B, 16C and 16D would readily bend in a specified direction.

Therefore, in the optical pickup apparatus 10 of the present embodiment, when the lens holder 12 is moved in the focusing direction, the portions 166 closer to the base end sections each having a generally rectangular cross section that is compressed and deformed in the focusing direction mainly bend, but are difficult to bend in the tracking direction. As a result, the linear members 16A, 16B, 16C and 16D would not twist in the tracking direction. Therefore, when the lens holder 12 is moved in the focusing direction, the lens holder 12 (and the objective lens 1) does not tilt.

Also, when the lens holder 12 is moved in the tracking direction, the portions 167 closer to the distal end sections each having a rectangular cross section that is compressed and deformed in the tracking direction mainly bend, but are difficult to bend in the focusing direction. As a result, the linear members 16A, 16B, 16C and 16D do not twist in the focusing direction. Therefore, when the lens holder 12 is moved in the tracking direction, the lens holder 12 (and the objective lens 1) does not tilt.

Also, in accordance with the present embodiment, the bendability of each portion of each of the linear members 16A, 16B, 16C and 16D can be adjusted by changing the degree and the range of deformation. Therefore, the characteristics of the linear members 16A, 16B, 16C and 16D can be adjusted and corrected depending on the specification and characteristic of the optical pickup apparatus 10. Accordingly, a higher degree of freedom in designing the optical pickup apparatus 10 is attained.

The optical pickup apparatus 10 having the structure described above may be manufactured by a method including the following steps. The lens holder 12 is supported on the fixing member 110 in a cantilever fashion by the four linear members 16 each having a uniform cross section as shown in FIG. 4. Then, specified portions of the linear members 16A, 16B, 16C and 16D in their longitudinal direction are compressed and deformed by a press in the focusing direction and in the tracking direction based on required characteristics of the lens holder 12 (and the objective lens 11). The press work may be performed in a similar manner as performed in the above described embodiments.

In one embodiment, the two linear members 16A and 16B are simultaneously compressed and deformed in the tracking direction, and then the other two linear members 16C and 16D are simultaneously compressed and deformed in the tracking direction. After the linear members 16A, 16B, 16C and 16D are compressed and deformed in the tracking direction, the two linear members 16A and 16C that overlap each other in the tracking direction are simultaneously compressed and deformed in the focusing direction, and the other two linear members 16B and 16D are simultaneously compressed and deformed in the focusing direction. Alternatively, the linear members 16A, 16B, 16C and 16D may be compressed and deformed in the focusing direction first, and then compressed and deformed in the tracking direction.

As described above, in accordance with the present invention, each of the four linear members that supports a lens holder in a cantilever fashion has a portion that is compressed and deformed in a focusing direction or a tracking direction along its longitudinal direction to thereby make a correction so that the linear members would bend only in a specified direction.

As a result, even when the optical pickup apparatus is reduced in size and thickness, the lens holder (and the objective lens) is prevented from tilting against movements of the lens holder in the focusing direction or the tracking direction. Also, only specified portions of the linear members are compressed and deformed in their longitudinal direction. Therefore, the bendability of the linear members can be adjusted by changing the location and the range of deformations with respect to the longitudinal direction of the linear members, or the degree of deformations. Moreover, the direction in which the linear members may readily bend can be adjusted by changing the location and the range of deformations with respect to the longitudinal direction of the respective linear members, or the degree of deformations.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An optical pickup apparatus comprising:
   an objective lens;
   a lens holder that retains objective lens;
   a fixing member;
   four linear members having base ends supported by the fixing member and distal ends coupled to the lens holder; and
   a driving device that generates a magnetic force between the lens holder and the fixing member to resiliently bend the linear members to thereby drive the objective lens in at least one of a focusing direction and a tracking direction,
   wherein the four linear members have a generally identical configuration, at least one portion of each of the four linear members in a longitudinal direction thereof having a cross section that is squeezed and deformed in at least one of the focusing direction and the tracking direction, and wherein each of the linear members has end sections each having a uniform circular cross section, and wherein each of the four linear members has a deformed portion with a generally rectangular cross section having a length in the focusing direction greater than a diameter of the circular cross section.

2. An optical pickup apparatus according to claim 1, wherein the four linear members are disposed in a manner that each two of the linear members overlap each other as viewed in the focusing direction and the tracking direction.

3. An optical pickup apparatus according to claim 2, wherein the deformed portion of each of the four linear members has a cross section that is compressed and deformed in the tracking direction.

4. An optical pickup apparatus according to claim 1, wherein the lens holder has a driving coil for focusing and tracking operations, and the linear members are formed from a metal material that also serves as a power supply line to the driving coil.

5. An optical pickup apparatus according to claim 2, wherein each of the four linear members has a deformed portion having a cross-sectional configuration that is squeezed and deformed in the focusing direction.

6. An optical pickup apparatus according to claim 5, wherein each of the linear members has end sections each having a uniform circular cross section, and the deformed portion of each of the four linear members has a generally rectangular cross section having a length in the tracking direction greater than a diameter of the circular cross section.

7. An optical pickup apparatus according to claim 6, wherein the lens holder has a driving coil for focusing and tracking operations, and the linear members are formed from a metal material that also serves as a power supply line to the driving coil.

8. An optical pickup apparatus according to claim 2, wherein each of the four linear members has a first portion in a longitudinal direction thereof that is squeezed and deformed in the tracking direction and a second portion that is squeezed and deformed in the focusing direction, wherein the first portions have an identical length and an identical width at an identical location, and the second portions have an identical length and an identical width at an identical location.

9. An optical pickup apparatus comprising:
an objective lens;
a lens holder that retains objective lens;
a fixing member;
four linear members having a generally identical configuration with one another, each of the linear members having base ends supported by the fixing member and distal ends coupled to the lens holder;
a driving device that generates a magnetic force between the lens holder and the fixing member to resiliently bend the linear members to thereby drive the objective lens in at least one of the focusing direction and the tracking direction,
wherein each of the four linear members has a first portion with a circular cross section and a second portion extending along a longitudinal direction thereof with a flattened non-circular cross section that is flattened to have a greater diameter in at least one of the focusing direction and the tracking direction than a diameter of the circular cross section.

10. An optical pickup apparatus according to claim 9, wherein each of the four linear members has end sections each defined by the first portion with a circular cross section and a central section defined by the second portion with a non-circular cross section between the end sections.

11. An optical pickup apparatus according to claim 10, wherein the central section is flattened by a compressive force applied in the tracking direction to have a greater diameter in the focusing direction and a smaller diameter in the tracking direction than the diameter of the circular cross section of the end section.

12. An optical pickup apparatus according to claim 10, wherein the central section is flattened by a compressive force applied in the focusing direction to have a greater diameter in the tracking direction and a smaller diameter in the focusing direction than the diameter of the circular cross section of the end section.

13. An optical pickup apparatus according to claim 9, wherein each of the four linear members has end sections and a central section each having a circular cross section, a first section between the central section and one of the end sections, the first section having a first non-circular cross section, and a second section between the central section and the other of the end sections, the second section having a second non circular cross section.

14. An optical pickup apparatus according to claim 13, wherein the first section is flattened by a compressive force applied in the tracking direction to have a greater diameter in the focusing direction and a smaller diameter in the tracking direction than the diameter of the circular cross section, and the second section is flattened by a compressive force applied in the focusing direction to have a greater diameter in the tracking direction and a smaller diameter in the focusing direction than the diameter of the circular cross section.

15. A method for manufacturing an optical pickup apparatus, the optical pickup apparatus comprising an objective lens that converges a laser beam on an optical recording medium, a lens holder that retains objective lens, a fixing member, and four linear members having base end sections supported by the fixing member and distal end sections coupled to the lens holder, wherein a magnetic force acting between the lens holder and the fixing member is used to resiliently bend the linear members to thereby drive the objective lens in at least one of a focusing direction and a tracking direction, the method comprising the steps of:
providing each of the four linear members with a circular cross section;
supporting the lens holder on the fixing member by the four linear members; and then
compressing and deforming in at least one of the focusing direction and the tracking direction to flatten at least one portion of each of the four linear members in a longitudinal direction thereof to thereby make a flattened non-circular cross section that is flattened to have a greater diameter than a diameter of the circular cross section.

16. A method for manufacturing an optical pickup apparatus according to claim 15, wherein the four linear members are disposed in a manner that each two of the linear members overlap each other as viewed in the focusing direction and the tracking direction, and the two of the linear members that overlap each other as viewed in the focusing direction are simultaneously compressed and deformed to form portions of the linear members that are deformed in the tracking direction.

17. A method for manufacturing an optical pickup apparatus according to claim 16, wherein the two of the linear members that overlap each other are simultaneously squeezed and deformed by a press.

18. A method for manufacturing an optical pickup apparatus according to claim 15, wherein the four linear members are disposed in a manner that each two of the linear members overlap each other as viewed in the focusing direction and the tracking direction, and the two of the linear members that overlap each other as viewed in the tracking direction are simultaneously compressed and deformed to form portions of the linear members that are deformed in the focusing direction.

19. A method for manufacturing an optical pickup apparatus according to claim 18, wherein the two of the linear members that overlap each other are simultaneously compressed and deformed by a press.

20. A method for manufacturing an optical pickup apparatus, the optical pickup apparatus comprising an objective lens, a lens holder that retains objective lens, a fixing member, four linear members having base end sections supported by the fixing member and distal end sections coupled to the lens holder, and a magnetic driver that generate a magnetic force acting between the lens holder and the fixing member to resiliently bend the linear members to thereby move the objective lens in at least one of a focusing direction and a tracking direction, the method comprising the steps of:

provide four linear members each having a circular cross section along an entire length thereof;

supporting the lens holder on the fixing member by the four linear members in a cantilever fashion; and applying a compressive force in at least one of the focusing direction and the tracking direction to flatten at least one portion of each of the four linear members to make a flattened non-circular cross section that is flattened to have a greater diameter than a diameter of the circular cross section.

21. A method for manufacturing an optical pickup apparatus according to claim 20, wherein the four linear members are disposed in a manner that each two of the linear members overlap each other as viewed in the focusing direction and the tracking direction, and central portions of the each two of the linear members that overlap each other as viewed in the focusing direction are simultaneously flattened by a compressive force applied in the tracking direction.

22. A method for manufacturing an optical pickup apparatus according to claim 21, wherein the two of the linear members that overlap each other are simultaneously flattened by a press.

23. A method for manufacturing an optical pickup apparatus according to claim 15, wherein the four linear members are disposed in a manner that each two of the linear members overlap each other as viewed in the focusing direction and the tracking direction, and central portions of the each two of the linear members that overlap each other as viewed in the tracking direction are simultaneously flattened by a compressive force applied in the focusing direction.

24. A method for manufacturing an optical pickup apparatus according to claim 23, wherein the two of the linear members that overlap each other are simultaneously compressed and deformed by a press.

* * * * *